United States Patent [19]

Young

[11] Patent Number: 4,851,199

[45] Date of Patent: Jul. 25, 1989

[54] METHODS FOR RECOVERING VANADIUM FROM PHOSPHORIC ACID AND VANADIUM SOURCES

[75] Inventor: Donald C. Young, Fullerton, Calif.

[73] Assignee: Union Oil Company of California, Los Angeles, Calif.

[21] Appl. No.: 110,172

[22] Filed: Oct. 19, 1987

Related U.S. Application Data

[63] Continuation-in-part of Ser. No. 688,683, Jan. 3, 1985, abandoned.

[51] Int. Cl.$^4$ .............................................. C01G 31/02
[52] U.S. Cl. ........................................ 423/65; 423/67; 423/321 R
[58] Field of Search ....................... 423/65, 67, 321 R; 75/101 R

[56] References Cited

U.S. PATENT DOCUMENTS

| | | | |
|---|---|---|---|
| 1,526,943 | 2/1925 | Thews | 423/68 |
| 2,130,579 | 9/1938 | Bowman | 423/67 |
| 3,190,719 | 6/1965 | Kelmers et al. | 423/67 |
| 3,615,167 | 10/1971 | Berthoux et al. | 423/67 |
| 3,700,415 | 10/1972 | Koerner et al. | 23/312 |
| 3,711,591 | 1/1973 | Hurst et al. | 423/10 |
| 3,835,214 | 9/1974 | Hurst et al. | 423/10 |
| 3,836,476 | 9/1974 | Baldwin et all. | 252/301.1 |
| 4,212,849 | 7/1980 | Lucid et al. | 423/10 |
| 4,241,027 | 12/1980 | Bowerman et al. | 423/10 |
| 4,341,743 | 7/1982 | Tebbe | 423/63 |
| 4,383,978 | 5/1983 | Beltz et al. | 423/9 |
| 4,427,641 | 1/1984 | Yoshikawa et al. | 423/18 |
| 4,452,768 | 6/1984 | Gradl et al. | 423/321 |
| 4,479,924 | 10/1984 | Plessen et al. | 423/321 |
| 4,526,762 | 7/1985 | Brown | 423/64 |

FOREIGN PATENT DOCUMENTS 49064   4/1982   European Pat. Off. ............. 423/65

Primary Examiner—Melvin J. Andrews
Attorney, Agent, or Firm—Michael H. Laird; G. Wirzbicki; June Bostich

[57] ABSTRACT

Vanadium is recovered from vanadium-containing phosphoric acid solutions by adjusting the pH so as to convert the dissolved vanadium to a simple vanadate compound which is insoluble in the phosphoric acid solution at the adjusted pH and separating the resulting insoluble simple vanadate compound from the phosphoric acid solution. The vanadium dissolved in the phosphoric acid solution can be converted to insoluble simple vanadates by reaction with oxidants and/or cations which form phosphoric acid-insoluble simple vanadates. These methods can be employed to selectively recover vanadium from phosphoric acid solutions containing other metals. They also can be employed to recover vanadium compounds from ores, scrap metal, and other vanadium sources by dissolving the vanadium from the vanadium source in phosphoric acid and recovering the vanadium as an insoluble simple vanadate from the phosphoric acid as described.

59 Claims, No Drawings

METHODS FOR RECOVERING VANADIUM FROM PHOSPHORIC ACID AND VANADIUM SOURCES

This application is a continuation-in-part of U.S. patent application Ser. No. 688,683, filed Jan. 3, 1985, now abandoned which is incorporated herein by reference in its entirety.

BACKGROUND OF THE INVENTION

1. Field of the Invention

This invention relates to the field of vanadium recovery, and, in particular, it relates to methods for recovering vanadium from phosphoric acid and from ores, metals, and other sources.

2. Description of the Art

Vanadium is employed in a wide variety of utilities including the manufacture of ferrous and non-ferrous metals, as a target material for x-rays, and for the manufacture of a variety of vanadium compounds, many of which, in turn, are employed for the manufacture of catalysts such as hydrocarbon conversion catalysts and catalysts for the manufacture of sulfuric acid. It is not found in its elemental form in nature but is prevalent in mire than 65 vanadium-containing minerals and rocks, principle of which are patronite, roscoelite, carnotite, and vanadinite. Vanadium is also found in a variety of processed materials and manufactured articles including wet-process phosphoric acid, partially or completely processed ores (including minerals and rocks) and mine tailings (including mining and processing residues), ferrous and non-ferrous vanadium alloys, petroleum coke, spent phosphoric acid pickling acids, petroleum, petroleum ash, ferrophosphorous slag from elemental phosphorous manufacture, coal and other sources.

The quantity of vanadium contained in just one source—merchant grade (green) wet-process phosphoric acid—would be sufficient, if recoverable, to supply a major portion, if not all, of the vanadium employed in industry. Wet-process phosphoric acid is typically defined as phosphoric acid which results from the dissolution of phosphate rock (calcium phosphate) in sulfuric acid to form free phosphoric acid and calcium sulfate. The latter, being insoluble, is separated from the phosphoric acid product by filtration to obtain a crude phosphoric acid solution of varying concentration (depending on processing conditions). The crude acid is a highly impure material, generally dark in color, and it contains relatively large amounts of dissolved metals, sulphates and smaller amounts of fluorides, fluorosilicates, and other salts of aluminum, magnesium, iron, uranium, vanadium, and other metals, as well as suspended organic matter.

Wet-process acid typically contains between about 25 and about 52 weight percent phosphorous expressed as $P_2O_5$ and about 0.1 to about 2 weight percent vanadium expressed as the metal. Vanadium is usually present in phosphoric acid, including wet-process acid and other phosphoric acid solutions, in a reduced state as the tri- or tetravalent vanadium-phosphate complex. This complex is very difficult to break chemically, and it is even more difficult to selectively recover vanadium from phosphoric acid solutions which contain other dissolved and/or complexed metals and metal salts.

While it is known that vanadium can be precipitated from phosphoric acid by neutralization of the acid to a pH of about 7, such treatment also results in the precipitation of other metal compounds. The vanadium can be recovered from such precipitates only by complex extraction procedures which require the use of relatively expensive organic extractants. One such process described by Hurst et al. in U.S. Pat. No. 3,835,214 involves the extraction of vanadium and/or uranium, while in a reduced valence state, from wet-process phosphoric acid into an organic phase containing certain orthophosphoric acid esters. In another process described by Hurst et al. in U.S. Pat. No. 3,711,591 and by Lucid et al. in U.S. Pat. No. 4,212,849, the vanadium and/or uranium are converted to an oxidized state and are extracted into an organic phase containing certain di-substituted esters of orthophosphoric acid together with a triorganophosphine oxide. The phosphoric acid esters involved in such processes include relatively expensive compounds such as di-(2-ethylhexyl)-phosphoric acid combined with trioctylphosphine oxide, and dioctylphenyl phosphoric acid combined with trioctylphosphine oxide. One variation of such processes which is described by Tebbe in U.S. Pat. No. 4,341,743 involves initially admixing wet-process phosphoric acid containing vanadium, and optionally uranium, with a mixture of a disubstituted ester of orthophosphoric acid and a triorganophosphine oxide as described by Hurst et al. and Lucid et al., supra, followed by gradual addition of hydrogen peroxide to oxidize the vanadium and uranium to vanadium (V) and uranium (VI) in order to increase hydrogen peroxide efficiency. According to Tebbe, supra, the lower valence states of vanadium and uranium are inefficiently extracted into the organic phase, and the efficient conversion of those elements to their higher oxidation states markedly increases extraction efficiency.

SUMMARY OF THE INVENTION

I have now found that vanadium can be recovered from vanadium-containing phosphoric acid solutions by adjusting the pH of the solution so as to convert the vanadium into one or more simple vanadate compounds which are insoluble in the pH adjusted phosphoric acid solution and separating the resulting insoluble vanadate from the phosphoric acid solution. Pentavalent vanadium, when present in phosphoric acid, is present primarily as vanadate anion. At a critical high concentration of phosphoric acid, usually as measured by the weight percent of $P_2O_5$, which concentration of acid usually corresponds to a pH too low to be measured with accuracy using standard pH measuring equipment, only simple vanadate anions can be formed. Therefore, by adjusting the concentration of the phosphoric acid to a level higher than this critical value, simple vanadates can be recovered from phosphoric acid by admixing with the concentrated phosphoric acid a sufficient amount of a compound having a cation which forms insoluble simple vanadates and which does not form insoluble phosphates in the concentrated phosphoric acid. Vanadium in reduced states, i.e., having a valence below 5, can be selectively recovered by oxidizing it to the pentavalent state and recovering the resulting pentavalent vanadium as insoluble simple vanadates.

DETAILED DESCRIPTION OF THE INVENTION

This invention provides methods for recovering vanadium from phosphoric acid which involve adjusting the concentration of the acid so as to convert the vanadium to a phosphoric acid-insoluble simple vanadate compound and recovery of the resulting insoluble simple vanadate compound. In particular, these methods involve the conversion of vanadium which is dissolved in phosphoric acid to phosphoric acid-insoluble pentavalent vanadium compounds (typically simple vanadates) thereby providing for the direct recovery of pure simple vanadate compounds from phosphoric acid.

Generally, in concentrated solutions, pH readings cannot be obtained with any accuracy in the pH range of about 1 and below due to variations in the liquid junction potential for concentrations of simple solute of about 0.2M or less (equivalent to about 25 weight percent of phosphoric acid in aqueous solution). See Kirk-Othmer *Encyclopedia of Chemical Technology*, Vol. 11, Second Edition, John Wiley & Sons, 1981. However, in concentrated phosphoric acid solutions there exists a critical concentration point, usually within this range of high acidity at which pH readings are unreliable but at which substantially the only kind of vanadate anion formed is a simple vanadate.

As used herein, the term "simple vanadate" refers to a member of a class of vanadium-containing chemical species which exist in solution in a form that bonds together only atoms of vanadium, vanadium and oxygen, or vanadium, oxygen and hydrogen. In simple vanadates no atoms of any other elements, such as phosphorous or impurity metals, bond with the vanadium, oxygen and hydrogen. In the practice of this invention, the simple vanadate always precipitates out of solution with a metal ion as the anion $VO^{-3}$ and/or as hydrated forms of the $VO^{-3}$ anion. If the simple vanadate contains any phosphorous or impurity metals, these atoms remain unbonded within the lattice as a mechanical mixture. Simple vanadates can have either positive or negative charges, that is, be ions, or have no charge, that is, be compounds. Examples of the chemical formulae of some well-known simple vanadates are: $VO$, $VO^{+2}$, $V^{+2}$, $V_2O_3$, $V^{+3}$, $VO_2$, $V_4O_9^{-2}$, $VO^{+3}$, $V^{+4}$, $V_2O_5$, $VO_3^-$, $V_2O_7^{-4}$, and $VO_4^{-3}$, $V_2O_7^{-4}$, and $V_6O_{17}^{-4}$.

Simple vanadates as the term is used herein are different than complex vanadates. To illustrate by analogy, a simple vanadate is as different from a complex vanadate as iron sulfate, a simple sulfate, is from the iron alums, which are all complex sulfates.

Complex vanadates form a distinct class of compounds generally known as heteropoly acids. These heteropoly acids are usually described in terms of the number of atoms of vanadium associated with "other anionic atoms" such as phosphorous. The well-characterized complex vanadates contain as "other atoms" Mo, W, I, Te, Fe, Cr, Al, Co, Rh, and Mn. All of these exhibit six-fold coordination with oxygen in their anions. (Van Wazer, J.R., *Phosphorous and Its Compounds*, Vol. 2, Interscience, N.Y., 958, pp. 559-60.)

Complex vanadates also differ from simple vanadates in the way they incorporate impurity metals, typically iron and aluminum. The impurity metals contained in complex vanadates are bonded directly into the heteropoly anion rather than existing within the anion as a solid solution. Though simple vanadates and complex vanadates can be formed by precipitation out of a common aqueous solution, but under different conditions, they are different products.

Since by definition a simple vanadate contains only vanadium, oxygen, and hydrogen, the process of precipitating simple vanadates taught herein can be used to selectively recover vanadium from a metals-laden stream in a form containing no metals or semi-metals such as phosphorous that can be utilized directly, as for example in homogeneous catalysts. By contrast, vanadium recovered from a process stream in the form of complex vanadates must be converted to simple vanadates before the vanadium can be used. For instance, the heteropoly anion can be destroyed by digesting it with alkali to dissolve the vanadium and precipitate the impurities. Then a simple vanadate salt is precipitated from the solution by adding a salt such as ammonium sulphate to yield simple ammonium metavanadate.

This invention presents a one-step method for selectively recovering vanadium from phosphoric acid solutions that contain a variety of other cations and which result from the manufacture of phosphoric acid or exposure of the phosphoric acid to other materials. For instance, these methods can be employed to recover vanadium from ores, scrap metal, and the like, by dissolving the vanadium in such sources with phosphoric acid and precipitating the vanadium as described above.

The methods of this invention have numerous significant benefits and advantages over the methods described in the art. For instance, the methods of this invention can be employed to recover vanadium from phosphoric acid with insignificant, if any, neutralization of the acid. Consequently, they enable the recovery of a commercially valuable material (vanadium) and reduce vanadium toxicity of the phosphoric acid, a result that is beneficial for agricultural and/or food use.

This invention presents a one-step method for selectively recovering vanadium from phosphoric acid solutions that contain a variety of other cations and which result from the manufacture of phosphoric acid or exposure of the phosphoric acid to other materials. For instance, these methods can be employed to recover vanadium from ores, scrap metal, and the like, by dissolving the vanadium in such sources with phosphoric acid and precipitating the vanadium as described above.

These methods can be employed to selectively recover vanadium in pure form, free of other metals, in the absence of subsequent separtion procedures. They involve simplified process steps as compared to the prior art and the use of inexpensive reactants (oxidants and precipitating cations), and they thereby avoid the need for relatively expensive organic extractants. They eliminate duplicative extraction steps and the need for subsequent recovery of vanadium from the extractant phase. Since these methods can be employed to quantitatively recover vanadium from phosphoric acid, they make possible improved processes for recovering vanadium from phosphoric acid-soluble vanadium sources such as ores, metals, and other materials. Pentavalent vanadium contained in phosphoric acid solutions can be converted to phosphoric acid-insoluble simple vanadate compounds by admixing with the solution a cation which forms phosphate-insoluble simple vanadate compounds and which does not form insoluble phosphates under the contacting conditions employed, particularly under the conditions of pH employed.

Vanadium in reduced valence states in phosphoric acid solutions can be converted to phosphoric acid-insoluble compounds (and recovered as such) by simultaneous and/or sequential oxidation of the reduced vanadium to pentavalent vanadium and reaction of the resulting pentavalent vanadium with one or more cations which form phosphoric acid-insoluble vanadates.

These methods can also be employed to recover vanadium from all sources from which vanadium can be extracted (dissolved) by phosphoric acid. Thus, vanadium can be selectively recovered from rocks, minerals, metals, and other vanadium sources selectively and quantitatively by first dissolving vanadium contained in the vanadium source in phosphoric acid and then converting the dissolved vanadium to an insoluble simple vanadate by the procedures discussed above.

The methods of this invention can be employed to remove vanadium from all types of phosphoric acid which contain dissolved vanadium in any valence state. Thus, these methods can be employed to remove vanadium from solutions containing orthophosphoric acid or the various forms of polyphosphoric acid (sometimes referred to as pyrophosphoric acid, metaphosphoric acid, superphosphoric acid and/or by other designations). Such acids can be obtained from any source including wet-process phosphoric acid, furnace grade acids, phosphoric acid derived from phosphate rock by the so-called hydrochloric acid process, partially purified acids, phosphoric acid which either has been employed to treat materials which contain vanadium (and which thereby contains dissolved vanadium) or which has been employed to extract vanadium from vanadium sources, and combinations of such acids.

The phosphoric acid solutions useful in this invention will usually be very acidic. However, these methods can be employed to selectively recover vanadium from phosphoric acid at any pH at which pentavalent vanadium exists as a free ion while the impurity metals do not exist as free metals, but are bound in complexes with phosphate ions. Typically vanadium exists as a free pentavalent ion at pH levels of about 2 and below.

Most concentrated phosphoric acid solutions have pH levels of about 1 or less, but exact pH readings in concentrated acids are generally considered unreliable due to known variations in the liquid junction potential for concentrations of simple solute of about 0.2M or less, as discussed above. In the practice of this invention it is critical that the acid solution should contain sufficient phosphoric acid measured as $P_2O_5$ so that, upon oxidation to the pentavalent state, the vanadium remains dissolved as a simple vanadate ion. In use, the presence of sufficient acidity in the process stream will usually be accomplished by adjusting the concentration of the phosphoric acid stream by any procedure that results in increasing the content of $P_2O_5$. Therefore, as used herein, the term "adjusting the concentration" of the phosphoric acid stream refers to any procedure by which the concentration of phosphoric acid as measured by the content of $P_2O_5$ is increased to the concentration at which vanadate anions convert to simple vanadates. Thus, the solution will usually contain at least about 2 weight percent, preferably at least about 10 weight percent, and typically about 2 to about 99.9 weight percent phosphoric acid expressed as $P_2O_5$. Presently preferred acids have $P_2O_5$ contents of at least about 40 weight percent and will generally contain about 30 to about 99.9 weight percent equivalent $P_2O_5$.

Phosphoric acid solutions which contain very minor amounts of vanadium can be treated to recover vanadium in accordance with the methods of this invention. Typically, however, the acids will contain at least about 0.1 weight percent and generally about 0.1 to about 10 weight percent vanadium expressed as the metal. Quite often, the treated acid will also contain one or more of a variety of other dissolved materials, including metal impurities, such as iron, manganese, calcium, uranium, fluorine, fluorosilicates, sulfuric acid (and possibly other acids), and other metals or compounds. Relatively high concentrations of such impurities are typically contained in crude phosphoric acids (derived from phosphate rock by the $H_2SO_4$ and HCl processes) and in acids which have been employed to leach and/or dissolve vanadium from minerals, alloys, or other vanadium sources.

The phosphoric acid solution can be partially neutralized prior to treatment provided that the pH level is maintained within the ranges discussed above. The phosphoric acids may contain any other materials which do not interfere with the solubility of vanadium in the phosphoric acid or with the ability of these methods to precipitate insoluble vanadium compounds from such acids. Illustrative of such other materials are other strong and/or weak acids such as sulfuric acid, hydrochloric acid, hydrofluoric acid, solvents, diluents, simple and complex salts, etc.

Vanadium sources from which vanadium can be recovered by dissolution into phosphoric acid in accordance with this invention include all organic and inorganic compositions which contain vanadium and from which vanadium can be dissolved or otherwise abstracted with phosphoric acid. I have found that even the most refractory materials, including platinum, gold, silica glass, and high nickel alloys such as those sold under the trademark "Hastelloy," can be dissolved in polyphosphoric acid at elevated temperatures, e.g., 200° C. and higher. Thus, vanadium can be recovered from virgin and processed ores including minerals and rocks, mine and mill tailings (including mining and ore processing residues), ferrous and nonferrous alloys, petroleum coke, petroleum, petroleum ash, ferrophosphorous slag from phosphorous manufacturer, coal, and other sources. More than 65 vanadium ores have been identified, the principle ores being patronite, roscolite, carnotite, and vanadanite. Of course, phosphate rock (primarily calcium phosphate) from which phosphoric acid is manufactured by the sulfuric acid and hydrochloric acid processes also contains vanadium and is the source of vanadium which exists in wet-process phosphoric acid.

The cations which form insoluble simple vanadates, and therefore which can be employed to precipitate free pentavalent vanadium ions from the described phosphoric acid solutions, include all cations which form simple vanadates which are insoluble in the treated phosphoric acid solution at the pH selected to assure generation of free pentavalent ions and which do not form phosphates which are insoluble in such phosphoric acid solutions. For instance, barium forms insoluble phosphates and is therefore unsuitable for use in these methods. Such nonphosphate precipitating cations may already be present in the phosphoric acid solution in which case their addition to the solution is not required. However, when such cations are not already present or are not present in concentrations sufficient to achieve the desired degree of vanadium recovery, their addition is necessary to effect precipitation of dissolved pentavalent vanadium. Such nonphosphate precipitating cations cations include ammonium and metal cations of periodic groups IA, IB, IIA, IIB, IVA, IVB, VIB, VIIB, VIII and combinations of these. Due to their improved reactivity, relatively low cost, and the value of the resulting precipitated vanadate compound, the presently preferred cations include ammonium and the alkali and alkaline earth metal cations which do not form phosphoric acid-insoluble phosphates. Ammonium, sodium, potassium, magnesium, and calcium cations are particularly preferred.

Such cations can effectively be introduced into the phosphoric acid solution by adding to the solution a metal or an organic or inorganic compound, or combinations thereof, which forms the desired cation in the phosphoric acid solution. Illustrative inorganic compounds include ammonium compounds and oxides, hydroxides and simple and complex salts of the metal cations. (The simple and complex metal salts may, of course, also contain ammonium ion.) Useful organic compounds are compounds which contain cations which form insoluble simple vanadates e.g., mono-, di-, and trialkyl ammonium compounds, such as salts, e.g., chlorides, carboxylic acid ammonium and/or metal salts, and the like. Relatively pH-neutral compounds, e.g., salts, are presently preferred cation sources due to their ready availability, relatively low cost, and their lack of acid-neutralizing ability. Such compounds do not neutralize the phosphoric acid and thereby change pH. Thus, their use makes possible the use of higher precipitating cation concentrations and more selective, efficient recovery of vanadium from the phosphoric acid solution, particularly when other metal impurities are present. Illustrative of such neutral salts are ammonium, potassium, sodium, magnesium, and calcium sulphates, chlorides, nitrates, etc. Ammonium, sodium, and potassium neutral salts are presently preferred due to their relatively high solubility and pH neutrality. Neutral ammonium-containing compounds are particularly preferred for the production of essentially pure ammonium vanadate.

Since vanadium dissolved in phosphoric acid is usually present in a reduced valence state, i.e., at a valence state below 5, the addition of an oxidizing agent is usually required to convert such dissolved vanadium to the pentavalent state. However, if sufficient dissolved vanadium already exists in the required pentavalent state, the addition of oxidants is not required in order to effect removal of that portion of the vanadium.

Suitable oxidants are compounds which are capable of oxidizing reduced vanadium to the pentavalent state at the concentrations at which the oxidant (or combination of oxidants) is employed. Such oxidants preferably have an oxidation potential higher than the potential of the vanadium (IV)—vanadium (V) oxidation potential (0.74 volts) as defined by the Stockholm Convention (IUPAC 1935) so that a stoichiometric amount of the added oxidant will be capable of oxidizing all vanadium to the pentavalent state. However, oxidants which have standard oxidation potentials lower than the vanadium (IV)—vanadium (V) standard potential can be employed provided that they are employed at concentrations sufficiently higher than the concentration of dissolved vanadium to oxidize the dissolved vanadium to the pentavalent state. The relationship between oxidation potential, oxidant and reductant concentrations, and oxidizing ability, is defined by the Nernst Equation:

$$E = E^o - (0.059/n) \log Q$$

wherein, $E$ is the effective oxidizing potential of the oxidant in the solution (EMF):

$E^o$ is the standard oxidation potential of the oxidant defined by the Stockholm Convention (IUPAC 1935) when the activity (which corresponds approximately to molar concentration) of the oxidized and reduced states of the participating atoms is one molar (or corresponds to unit activity as in the case of an insoluble precipitate in contact with the solution);

$Q$ is the activity ratio (which corresponds with concentration ratio) of the oxidized to the reduced state of the involved oxidants and reductants; and $n$ is the number of electrons which are transferred in the oxidation process.

For instance, one electron is transferred in the process of converting vanadium (IV) to vanadium (V). Furthermore, when $Q$ is unity (1), $E$ equals $E^o$; i.e., the effective oxidizing potential of the oxidant in the solution corresponds to the standard oxidation potential defined by the Stockholm Convention. When the activity (concentration) of the oxidant in the solution is greater than the activity of the reductant, $Q$ is greater than 1 and $E$ is slightly greater than $E^o$; i.e., the effective oxidizing potential of the oxidant in the solution is slightly higher than the Stockholm Convention standard oxidation potential for that oxidant.

As illustrated by the Nernst Equation, oxidants which have standard oxidizing potentials slightly (e.g., 10 percent or less) below the standard potential of the vanadium (IV)—vanadium (V) reaction can oxidize vanadium to the pentavalent state provided that they are employed in sufficiently high concentrations relative to the concentration of dissolved vanadium. The solubilities (i.e., maximum concentrations) of salts, oxides, and other non-volatile oxidizing compounds can be increased by increasing solution temperature, and the solubility of volatile oxidants such as oxygen and chlorine can be increased by increasing the partial pressure of the oxidizing gas over the phosphoric acid solution. Thus, the oxidizing potential of oxidizing gases, such as oxygen, chlorine, etc., can be increased by providing a super-atmospheric partial pressure of the oxidizing gas over the solution, e.g., two atmospheres or more.

Illustrative of presently preferred oxidants are nitric acid, chlorine, bromine, nitrogen oxides, bromates such as ammonium and alkali metal bromates, perchlorates such as ammonium and alkali metal perchlorates, manganese dioxide, dichromates (e.g., ammonium, sodium, etc.), hydrogen peroxide, permanganates such as sodium permanganate, iodates such as potassium iodate, ozone, fluorine, perthiosulphates such as ammonium perthiosulphate, organic peroxides, oxygen (pressurized to achieve sufficient oxidizing potential), chromates such as sodium and magnesium chromates, and the like. The useful solutions may optionally contain weak oxidants which may assist in the process by oxidizing solution components other than vanadium, thereby reducing the consumption of the strong oxidant by its reaction with such components.

In accordance with the methods of this invention, the precipitating cation (if not already present) is admixed with the phosphoric acid solution in amounts sufficient to form the desired quantity of insoluble vanadate. Generally, it is preferable to recover as much vanadium as possible. Thus, the precipitating cation will be added in amounts at least equivalent to the stoichiometric amount of vanadate anion present in the solution. In order to assure quantitative separation, it may be desirable to add an excess, e.g., 10 percent excess of precipitating cation.

The oxidant can be added (if required to convert reduced vanadium to pentavalent vanadium) either before, after, or concurrently with the precipitating cation by admixing the oxidant or oxidants with the phosphoric acid solution.

The oxidant concentration required to convert a given amount of reduced vanadium to pentavalent vanadium can be determined by simple stoichiometry. Thus, the amount of oxidant admixed with the phosphoric acid solution should be sufficient to extract at least the number of electrons from the dissolved vanadium required to convert it to the pentavalent state and to make up for oxidant which is consumed by other reductants present in the solution. For instance, wet-process phosphoric acid often contains organic compounds and dissolved carbon which can be oxidized by the oxidizing agent useful in the methods of this invention. Accordingly, the amount of oxidant added to the solution is preferably sufficient to oxidize all components present in the solution which will reduce the oxidizing agent and to oxidize all of the vanadium present in the solution to the pentavalent state. The exact quantity of oxidant required to achieve this objective in any given case can be determined by adding to a sample of the acid solution to be treated, an excess of a precipitating cation useful in this invention and then titrating the resulting sample with oxidant until the total amount of vanadium known to be present in the solution (by analysis) has been recovered from the solution.

Generally, the oxidant concentration should be sufficient to oxidize all reductants in addition to converting all dissolved vanadium to the pentavalent state. Quantitative vanadium recovery can be more adequately assured, however, by employing a slight excess of oxidant, i.e., at least 10 percent in excess of the calculated stoichiometric quantity. The concentration and valence state of vanadium dissolved in the phosphoric acid solution can be readily determined by well known analytical techniques such as x-ray fluoresence, atomic absorption and/or polarography.

The precipitated vanadate compound can be recovered from the phosphoric acid solution by any one of several liquid-solid separation techniques such as filtration, centrifuging, decanting, and the like.

When it is desired to recover vanadium from a vanadium source by dissolving the vanadium with phosphoric acid in accordance with this invention, the vanadium source is contacted with sufficient phosphoric acid having a sufficient $P_2O_5$ concentration to dissolve the desired amount of vanadium from the vanadium source. More concentrated phosphoric acid solutions having lower pH levels are capable of dissolving more difficult to dissolve materials. Polyphosphoric acid is capable of dissolving vanadium even from the most refractory materials such as vanadium-nickel-cobalt alloys and the like, particularly at elevated temperatures. Thus, such difficult to dissolve materials can be treated with polyphosphoric acid at elevated temperatures in excess of 100° C. or in excess of 150° C. to produce the desired solution. Polyphosphoric acid containing at least 20 percent polymeric phosphoric acid can be employed to dissolve essentially all known alloys at temperatures of about 200° C. and above. The dissolved vanadium can be selectively recovered from the resulting phosphoric acid solution by the addition of precipitating cations and/or oxidants as described above.

The invention is further described by the following examples which are illustrative of specific modes of practicing the invention and are not intended as limiting the scope of the invention as defined by the appended claims.

EXAMPLE 1

One liter of merchant grade, green phosphoric acid having an equivalent $P_2O_5$ analysis of 52 weight percent and containing approximately 1100 mg. of dissolved vanadium in addition to other impurities including sulfuric acid, aluminum, iron, fluorine, silica (as compounds), and others, is admixed with 100 ml. of an aqueous solution containing 35 weight percent nitric acid and 26 weight ammonium nitrate at 90° C. for about 30 minutes. A bright yellow precipitate forms rapidly and the solution is observed to effervesce. Approximately 2 grams of the bright yellow precipitate is recovered by filtration and is shown by analysis to be essentially pure ammonium metavanadate ($NH_4VO_3$). No other metal is detected in the precipitate. A sample of the gas which effervesced from the solution during the reaction is obtained and is shown to be nitrogen by gas analysis. Analysis of the filtrate establishes that the soluble vanadium content of the remaining phosphoric acid is less than 200 mg.

EXAMPLE 2

Vanadium can be recovered from 2 pounds of finely divided high speed steel scrap containing 2.5 weight percent vanadium by dissolving the steel scrap for three hours at 150° C. with agitation in 1 gallon of polyphosphoric acid having a pH below 1 and in which 40 percent of the $P_2O_5$ is present as polyphosphate. The dissolved vanadium can be recovered from the resulting polyphosphoric acid solution by gradually adding to the solution 0.03 pounds of hydrogen peroxide followed by dissolving in the oxidized solution 0.2 pounds of ammonium phosphate.

While particular embodiments of this invention have been described, it will be understood, of course, that the invention is not limited thereto since many obvious modifications can be made, and it is intended to include within this invention any such modifications as will fall within the spirit and scope of the appended claims. In particular, reference should be made to my abandoned application, Ser. No. 688,685 filed Jan. 3, 1985 for Methods For Recovering Vanadium From Acids And Vanadium Sources, the disclosure of which is incorporated herein by reference in its entirety.

Having described my invention, I claim:

1. A method for recovering vanadium from a vanadium-containing phosphoric acid solution containing impurity metals which method comprises the steps of (a) adjusting the concentration of phosphoric acid in the solution to a concentration at which the vanadium converts to one or more simple vanadate compounds insoluble in said adjusted phosphoric acid solution and (b) separating the resulting insoluble simple vanadate compound or compounds from said phosphoric acid solution.

2. The method defined in claim 1 wherein step (a) comprises admixing with said vanadium-containing phosphoric acid solution a compound containing a cation which forms corresponding simple vanadate compounds insoluble in said phosphoric acid solution at said adjusted concentration and which does not form phosphate compounds insoluble in said phosphoric acid solution at said adjusted concentration 3. The method defined in claim 1 wherein said vanadium-containing phosphoric acid solution comprises dissolved metals in addition to vanadium, said vanadium is converted to said insoluble simple vanadate compound at said adjusted concentration and the resulting insoluble vanadate compound is selectively recovered from said phosphoric acid solution.

4. The method defined in claim 1 wherein said vanadium-containing phosphoric acid solution is contacted with an oxidant capable of converting vanadium at a valence state below 5 to pentavalent vanadium.

5. The method defined in claim 4 wherein step (a) further comprises admixing with said vanadium-containing phosphoric acid solution a compound containing a cation which forms a simple vanadate compound insoluble in said phosphoric acid solution at said adjusted concentration and which does not form phosphate compounds insoluble in said phosphoric acid solution at said adjusted concentration.

6. The method defined in claim 2 wherein said cation is selected from the group consisting of ammonium and alkali and alkaline earth metal cations, and combinations thereof.

7. The method defined in claim 2 wherein step (a) further comprises introducing into said vanadium-containing phosphoric acid solution a compound selected from the group consisting of ammonia, compounds containing sodium, potassium, ammonium, calcium, or magnesium cations, and combinations thereof.

8. The method defined in claim 2 wherein step (a) further comprises introducing into said vanadium-containing phosphoric acid solution a compound selected from the group consisting of ammonia, compounds having cations of metals selected from periodic groups IA, IB, IIA, IIB, IVA, IVB, VIB, VIIB, or VIII, and combinations thereof.

9. The method defined in claim 1 wherein said vanadium-containing phosphoric acid solution contains at least about 0.1 weight percent vanadium expressed as the element.

10. The method defined in claim 1 wherein said vanadium-containing phosphoric acid solution comprises at least about 30 weight percent phosphoric acid expressed as $P_2O_5$.

11. The method defined in claim 1 wherein said vanadium-containing phosphoric acid solution comprises about 40 to about 99.9 weight percent phosphoric acid expressed as $P_2O_5$.

12. The method defined in claim 1 wherein said vanadium-containing phosphoric acid solution comprises wet-process phosphoric acid.

13. The method defined in claim 1 wherein said vanadium-containing phosphoric acid solution comprises polyphosphoric acid.

14. The method defined in claim 2 wherein said compound admixed with said vanadium-containing phosphoric acid solution comprises a member selected from the group consisting of ammonia, ammonium-containing compounds, and combinations thereof.

15. The method defined in claim 2 wherein said compound admixed with said vanadium-containing phosphoric acid solution is selected from the group consisting of ammonium hydroxide, ammonia, inorganic ammonium salts, and combinations thereof.

16. The method defined in claim 2 wherein said compound admixed with said vanadium-containing phosphoric acid solution comprises a compound selected from the group consisting of di- and trialkyl ammonium compounds and combinations thereof.

17. The method defined in claim 4 wherein said oxidant has a standard oxidizing potential greater than pentavalent vanadium.

18. The method defined in claim 4 wherein said oxidant is selected from the group consisting of nitric acid, chlorine, nitrogen oxides, bromates, perchlorates, manganese dioxide, dichromates, hydrogen peroxide, permanganates, iodates, ozone, bromine, fluorine, perthiosulfates, organic peroxides, oxygen, chromates, and combinations thereof.

19. The method defined in claim 1 wherein step (a) further comprises admixing with said vanadium-containing phosphoric acid solution (1) an oxidant selected from the group consisting of nitric acid, chlorine, nitrogen oxides, bromates, perchlorates, manganese dioxide, bromine, dichromates, hydrogen peroxide, permanganates, iodates, ozone, fluorine, perthiosulfates, organic peroxides, oxygen, chromates, and combinations thereof, and (2) a compound selected from the group consisting of ammonium and compounds containing sodium, potassium, ammonium, calcium, or magnesium cations, and combinations thereof.

20. The method defined in claim 1 wherein said vanadium-containing phosphoric acid solution comprises at least about 30 weight percent phosphoric acid expressed as $P_2O_5$ and at least about 0.1 weight percent vanadium expressed as the element, and which method further comprises in step (a) admixing with said vanadium-containing phosphoric acid solution (1) an oxidant selected from the group consisting of nitric acid, chlorine, nitrogen oxides, bromates, perchlorates, magnesium dioxide, dichromates, hydrogen peroxide, permanganates, iodates, ozone, bromine, fluorine, perthiosulfates, peroxides, oxygen, chromates, and combinations thereof, and (2) a compound selected from the group consisting of ammonia, and compounds containing sodium, potassium, ammonium, calcium, or magnesium cations, and combinations thereof.

21. A method for selectively recovering vanadium from a pentavalent vanadium-containing phosphoric acid solution also containing impurity metals, which method comprises (1) admixing with said phosphoric acid solution one or more compounds containing a cation which forms one or more simple vanadate compounds insoluble in said impurity containing phosphoric acid solution and which does not form phosphates insoluble in said impurity-containing phosphoric acid solution and (2) adjusting the concentration of phosphoric acid in said solution and thereby converting said pentavalent vanadium to a pentavalent simple vanadate compound essentially free of the impurity metals and insoluble in the concentrated phosphoric acid solution.

22. The method defined in claim 21 wherein said cation is selected from the group consisting of ammonium and alkali and alkaline earth metal cations, and combinations thereof.

23. The method defined in claim 21 wherein said compound containing a cation is selected from the group consisting of ammonia and ammonium-containing compounds and combinations thereof.

24. A method for selectively recovering vanadium from a vanadium-containing phosphoric acid solution which contains metals in addition to vanadium, which method comprises the steps of (a) adjusting the concentration of $P_2O_5$ in said solution sufficiently to convert said vanadium to a simple vanadate compound insoluble in said phosphoric acid solution, and (b) separating the resulting insoluble compound from said phosphoric acid solution.

25. The method defined in claim 24 in which step (a) comprises admixing with said phosphoric acid solution, (1) a compound containing a cation which forms simple vanadate compounds insoluble in said phosphoric acid solution at said adjusted pH and which does not form phosphate compounds insoluble in said phosphoric acid solution at said adjusted pH and (2) an oxidant capable of converting vanadium having a valence state below 5 to pentavalent vanadium.

26. The method defined in claim 25 wherein said compound containing said cation is selected from the group consisting of ammonia and compounds containing sodium, potassium, ammonium, calcium, or magnesium cations, and combinations thereof.

27. The method defined in claim 25 wherein said vanadium-containing phosphoric acid solution comprises at least about 30 weight percent phosphoric acid expressed as $P_2O_5$.

28. The method defined in claim 24 wherein said vanadium-containing phosphoric acid solution comprises wet-process phosphoric acid.

29. The method defined in claim 25 wherein said oxidant is selected from the group consisting of nitric acid, chlorine, nitrogen oxides, bromates, perchlorates, manganese dioxide, dichromates, hydrogen peroxide, permanganates, iodates, ozone, bromine, fluorine, perthiosulfates, peroxides, oxygen, chromates, and combinations thereof.

30. A method for selectively recovering simple vanadate compounds from a vanadium-containing phosphoric acid solution which contains other metals in addition to vanadium, which method comprises (1) admixing with said vanadium-containing phosphoric acid solution (a) an oxidant capable of converting vanadium having a valence below 5 to pentavalent vanadium, and (b) a compound containing a cation which forms simple vanadate compounds insoluble in said phosphoric acid solution and which does not form phosphates insoluble in said phosphoric acid solution and (2) adjusting the acidity of the acid solution sufficiently to cause precipitation of simple vanadate compounds.

31. A method for selectively recovering simple vanadate compounds from wet-process phosphoric acid which method comprises (1) admixing with said wet-process phosphoric acid (a) an oxidant capable of converting vanadium which has a valence state below 5 to pentavalent vanadium and (b) a compound selected from the group consisting of ammonia and compounds containing sodium, potassium, ammonium, calcium, or magnesium cations, and combinations thereof, in proportions sufficient to precipitate at least a portion of said vanadium from said acid as simple vanadate compounds and (2) adjusting the concentration of the acid solution sufficiently to cause precipitation of said simple vanadate compounds.

32. A method for selectively recovering simple vanadate compounds from wet-process phosphoric acid, which method comprises (1) admixing with said phosphoric acid (a) an oxidant capable of converting vanadium which has a valence below 5 to pentavalent vanadium and (b) a member selected from the group consisting of ammonia, ammonium compounds, and combinations thereof in proportions sufficient to precipitate at least a portion of said vanadium as simple ammonium vanadate at an adjusted pH, and (2) adjusting the acid concentration of said solution sufficiently to cause precipitation of said simple ammonium vanadate.

33. A method for selectively recovering vanadium from a vanadium-containing phosphoric acid solution which comprises wet-process phosphoric acid, which method comprises (1) admixing with said vanadium-containing phosphoric acid solution (a) an oxidant selected from the group consisting of nitric acid, chlorine, nitrogen oxides, bromates, perchlorates, manganese dioxide, dichromates, hydrogen peroxide, permanganates, iodates, ozone, bromine, fluorine, perthiosulfates, organic peroxides, oxygen, chromates, and combinations thereof and (b) a compound selected from the group consisting of ammonia and ammonium-containing compounds and combinations thereof in proportions sufficient to selectively precipitate at least a portion of said vanadium from said phosphoric acid solution as simple ammonium vanadate at an adjusted pH; (2) adjusting the acid concentration of the solution sufficiently to cause precipitation of said simple ammonium vanadate; and (3) separating the precipitated simple ammonium vanadate from said concentrated phosphoric acid solution.

34. A method for recovering vanadium from a vanadium-containing material, which method comprises the steps of (1) dissolving at least a portion of said vanadium from said material in phosphoric acid to form a vanadium-containing phosphoric acid solution, (2) adjusting the concentration of $P_2O_5$ in said solution sufficiently to convert the resulting dissolved vanadium to a simple vanadate compound insoluble in phosphoric acid, and (3) separating the resulting insoluble vanadate compound from said concentrated phosphoric acid solution.

35. The method defined in 34 wherein said vanadium-containing material is selected from the group consisting of virgin and processed ores, mining and ore processing residues, ferrous and non-ferrous metals, petroleum coke, spent metal-pickling acids, petroleum, petroleum ash, ferrophosphorous slag, coal, and combinations thereof.

36. The method defined in claim 34 wherein said vanadium-containing phosphoric acid solution comprises at least about 30 weight percent phosphoric acid expressed as $P_2O_5$.

37. The method defined in claim 34 wherein said vanadium-containing phosphoric acid solution comprises polyphosphoric acid.

38. The method defined in claim 34 wherein said phosphoric acid comprises polyphosphoric acid, and said polyphosphoric acid is contacted with said vanadium-containing material at a temperature of at least about 100° C.

39. The method defined in claim 34 wherein said phosphoric acid comprises polyphosphoric acid, and said polyphosphoric acid is contacted with said vanadium-containing material at a temperature of at least about 150° C.

40. The method defined in claim 34 wherein said phosphoric acid comprises at least about 30 weight percent phosphoric acid expressed as $P_2O_5$, and said method comprises the step of admixing with said vanadium-containing phosphoric acid solution a compound containing a cation which forms simple vanadates insoluble in said concentrated phosphoric acid and which does not form phosphates insoluble in said concentrated phosphoric acid.

41. The method defined in claim 40 wherein said vanadium-containing material contains metals other than vanadium which also are soluble in said concentrated phosphoric acid, and said vanadium is selectively recovered as simple vanadate from said concentrated phosphoric acid solution.

42. The method defined in claim 34 wherein said phosphoric acid comprises at least about 30 weight percent phosphoric acid expressed as $P_2O_5$, and said method comprises the step of admixing with said vanadium-containing phosphoric acid solution an oxidant capable of converting vanadium which has a valence state below 5 to pentavalent vanadium.

43. The method defined in claim 34 wherein said phosphoric acid comprises at least about 30 weight percent phosphoric acid expressed as $P_2O_5$, and said method comprises (a) admixing with said vanadium-containing phosphoric acid solution an oxidant capable of converting vanadium which has a valence state below 5 to pentavalent vanadium and (b) a compound having a cation which forms simple vanadates insoluble in said phosphoric acid solution and which does not form phosphates insoluble in said phosphoric acid solution.

44. The method defined in claim 43 wherein said vanadium-containing material contains metals other than vanadium soluble in said phosphoric acid solution, and said vanadium is selectively recovered from said vanadium-containing phosphoric acid solution.

45. The method defined in claim 34 wherein said phosphoric acid comprises at least about 30 weight percent phosphoric acid expressed as $P_2O_5$, and said method comprises admixing with said vanadium-containing phosphoric acid solution (a) an oxidant capable of converting vanadium which has a valence below 5 to pentavalent vanadium and (b) a compound selected from the group consisting of ammonia and compounds containing ammonium, sodium, potassium, calcium or magnesium cations, and combinations thereof.

46. The method defined in claim 45 wherein said vanadium-containing material contains metals other than vanadium soluble in said phosphoric acid solution, and said vanadium is selectively recovered from said vanadium-containing phosphoric acid solution.

47. A method for selectively recovering vanadium from a vanadium-containing material which also contains metals other than vanadium soluble in phosphoric acid, which method comprises (1) dissolving at least a portion of said vanadium contained in said material by contact with phosphoric acid comprising at least 30 weight percent phosphoric acid expressed as $P_2O_5$, (2) admixing with the resulting vanadium-containing phosphoric acid solution (a) an oxidant capable of converting vanadium which has a valence below 5 to pentavalent vanadium and (b) a compound that forms simple vanadates insoluble in said phosphoric acid solution and that does not form phosphates insoluble in said phosphoric acid solution, and (3) adjusting the concentration of $P_2O_5$ in said solution so as to selectively recover said insoluble simple vanadium compound from said phosphoric acid solution.

48. The method defined in claim 47 wherein said compound is selected from the group consisting of ammonia and compounds containing sodium, potassium, ammonium, calcium, or magnesium cations and combinations thereof.

49. A method for selectively recovering vanadium from a vanadium-containing material which material contains metals other than vanadium soluble in polyphosphoric acid, which method comprises the steps of dissolving at least a portion of the vanadium contained in said vanadium-containing material in polyphosphoric acid to form a solution which contains metals in addition to vanadium, admixing with said vanadium-containing phosphoric acid solution (a) an oxidant capable of oxidizing said vanadium to pentavalent vanadium and (b) a compound selected from the group consisting of ammonia, ammonium-containing compounds, and combinations thereof in proportion sufficient to precipitate at least a portion of said vanadium a simple ammonium vanadate, and recovering the thus precipitated simple ammonium vanadate from said solution.

50. The method defined in claim 4 wherein said oxidant is selected from the group consisting of nitric acid, ozone, and hydrogen peroxide.

51. The method defined in claim 19 wherein the oxidant is selected from the group consisting of nitric acid, ozone, and hydrogen peroxide.

52. The method defined in claim 19 wherein the oxidant is selected from the group consisting of nitric acid, ozone, and hydrogen peroxide.

53. The method defined in claim 25 wherein the oxidant is selected from the group consisting of nitric acid, ozone, and hydrogen peroxide.

54. A method for recovering vanadium from a vanadium-containing phosphoric acid solution, which method consists essentially of the steps of (a) adjusting the acid concentration of the solution so as to convert said vanadium to one or more simple vanadate compounds insoluble in said concentrated phosphoric acid solution and (b) separating the resulting insoluble simple vanadate compound or compounds from said phosphoric acid solution.

55. A method for recovering vanadium from a pentavalent vanadium-containing phosphoric acid solution containing metal ions in addition to vanadium, which method consists essentially of (1) admixing with said phosphoric acid solution one or more compounds containing a cation which forms one or more simple vanadate compounds insoluble in said phosphoric acid solution and which does not form phosphates insoluble in said phosphoric acid solution and (2) adjusting the acidity of said solution so as to convert said pentavalent vanadium to a pentavalent simple vanadate compound essentially free of the impurity metals and insoluble in the pH-adjusted phosphoric acid solution.

56. A method for selectively recovering vanadium from a vanadium-containing phosphoric acid solution containing dissolved vanadium and metals in addition to vanadium, which method comprises the steps of (a) adjusting the concentration of phosphoric acid in said solution so as to convert said vanadium to a simple vanadate compound insoluble in said pH-adjusted phosphoric acid solution, and (b) separating the resulting insoluble vanadate compound from said phosphoric acid solution.

57. A method for selectively recovering vanadium from a pentavalent vanadium-containing phosphoric acid solution, which method comprises (a) admixing with said phosphoric acid solution sufficient amounts of a compound containing a cation which selectively forms insoluble simple vanadate compounds but does not form insoluble phosphates in said phosphoric acid solution at a critical acid concentration and (b) adjusting the concentration of the phosphoric acid solution to said critical concentration.

58. A method for selectively recovering vanadium, in the form of a simple vanadate compound, from a concentrated phosphoric acid solution containing between about 30 and 99.9 weight percent equivalent $P_2O_5$ and further containing dissolved vanadium and other metals in addition to vanadium, which method comprises admixing with said vanadium-containing phosphoric acid solution an oxidant selected from the group consisting of nitric acid, chlorine, nitrogen oxides, bromates, perchlorates, magnesium dioxide, dichromates, hydrogen peroxide, permanganates, iodates, ozone, bromine, fluorine, perthiosulfates, peroxides, oxygen, chromates, and combinations thereof, and a compound selected from the group consisting of ammonia and compounds containing sodium, potassium, ammonium, calcium, or magnesium cations, and combinations thereof under conditions sufficient to precipitate at least a portion of said vanadium as said simple vanadate compound in the substantial absence of compounds other than said simple vanadate compound.

59. The method of claim 58 wherein the oxidant is selected from the group consisting of nitric acid, ozone, and hydrogen peroxide.

* * * * *

UNITED STATES PATENT AND TRADEMARK OFFICE
CERTIFICATE OF CORRECTION

PATENT NO.   : 4,851,199

DATED        : July 25, 1989

INVENTOR(S)  : Donald C. Young

It is certified that error appears in the above-identified patent and that said Letters Patent is hereby corrected as shown below:

Cancel claims 1-20, 24-29, 30-46 and 52-57.

Claim 50, Column 16, line 15, delete "4" and insert therefor -- 49 --.

Claim 51, Column 16, line 18, delete "19" and insert therefor -- 47 --.

Signed and Sealed this

Twentieth Day of November, 1990

Attest:

HARRY F. MANBECK, JR.

Attesting Officer

Commissioner of Patents and Trademarks